United States Patent
Folk et al.

(10) Patent No.: US 7,152,628 B2
(45) Date of Patent: Dec. 26, 2006

(54) ANTI-CAVITATION VALVE ASSEMBLY

(76) Inventors: Robert Folk, 19 Carmel Ct., Laguna Beach, CA (US) 92651; David Becker, 238 Camellia St., Anaheim, CA (US) 92627

(*) Notice: Subject to any disclaimer, the term of this patent is extended or adjusted under 35 U.S.C. 154(b) by 81 days.

(21) Appl. No.: 10/953,005

(22) Filed: Sep. 28, 2004

(65) Prior Publication Data
US 2005/0166976 A1 Aug. 4, 2005

Related U.S. Application Data

(60) Provisional application No. 60/542,111, filed on Feb. 4, 2004.

(51) Int. Cl.
*F16K 1/52* (2006.01)
(52) U.S. Cl. .................. 137/625.33; 137/625.3
(58) Field of Classification Search .......... 137/625.3, 137/625.33, 625.37, 625.38, 625.39
See application file for complete search history.

(56) References Cited

U.S. PATENT DOCUMENTS

| | | | | |
|---|---|---|---|---|
| 1,307,986 A | * | 6/1919 | Randall et al. | 137/625.39 |
| 1,383,005 A | * | 6/1921 | Mertens | 137/454.6 |
| 3,117,590 A | * | 1/1964 | Nelson et al. | 137/504 |
| 3,157,200 A | * | 11/1964 | Rowan | 137/625.33 |
| 3,330,294 A | * | 7/1967 | Manning et al. | 137/315.11 |
| 3,540,484 A | * | 11/1970 | Brown et al. | 138/43 |
| 3,693,659 A | * | 9/1972 | Parola | 137/625.3 |
| 3,776,278 A | * | 12/1973 | Allen | 137/625.38 |
| 3,813,079 A | * | 5/1974 | Baumann et al. | 251/127 |
| 3,990,475 A | * | 11/1976 | Myers | 137/625.3 |
| 4,022,423 A | * | 5/1977 | O'Connor et al. | 251/127 |
| 4,024,891 A | | 5/1977 | Engel et al. | |
| 4,180,100 A | | 12/1979 | Kolb et al. | |
| 4,375,821 A | * | 3/1983 | Nanao | 137/239 |
| 4,384,592 A | | 5/1983 | Ng | |
| 4,397,331 A | * | 8/1983 | Medlar | 137/375 |
| 4,567,915 A | | 2/1986 | Bates et al. | |
| 4,650,155 A | | 3/1987 | Liantonio | |
| 4,693,450 A | | 9/1987 | Paetzel | |
| 4,825,906 A | * | 5/1989 | Hartman | 137/625.3 |
| 4,860,993 A | | 8/1989 | Goode | |
| 4,921,014 A | | 5/1990 | Tartaglia et al. | |
| 5,018,703 A | | 5/1991 | Goode | |
| 5,769,123 A | * | 6/1998 | Heestand et al. | 137/625.38 |
| 5,964,248 A | * | 10/1999 | Enarson et al. | 137/625.39 |
| 6,935,371 B1 | * | 8/2005 | Stares | 137/625.37 |

OTHER PUBLICATIONS

Singer Valve Inc., Model 106-PG Main Valve with Anti-Caviation Trim/Control Valve—Catalog.

* cited by examiner

*Primary Examiner*—John Fox

(57) ABSTRACT

A valve assembly for reducing cavitation includes a seat disposed within a valve housing intermediate a fluid inlet and outlet thereof. A disc guide is associated with the seat so as to be slidably moveable relative to the seat. The seat includes a wall defining an inner-chamber and having elongated slots formed therein so as to direct fluid towards a central portion of the fluid chamber. The disc guide includes a wall having elongated slots formed on an upper portion thereof, and a non-slotted lower portion configured to substantially occlude the elongated slots of the seat when the disc guide is moved into a closed position.

25 Claims, 5 Drawing Sheets

ANTI-CAVITATION VALVE ASSEMBLY

RELATED APPLICATION

This application claims the benefit of U.S. Provisional Application No. 60/542,111, filed Feb. 4, 2004.

BACKGROUND OF THE INVENTION

The present invention generally relates to control valves in high pressure fluid transfer systems. More particularly, the present invention relates to a control valve having anti-cavitation and low-noise properties.

When subjected to high-pressure differentials or high flow rates, valves often exhibit excessive noise and vibration. This is usually attributable to the phenomenon of cavitation, which can range from relatively harmless levels called incipient cavitation to significantly more acute levels that actually damage valves and related piping. This can be loud enough to cause hearing loss in plant personnel if subjected to it for extended periods of time. Cavitation occurs if the velocity of the fluid in the valve seating area becomes excessive, creating a sudden severe reduction in pressure that transforms the liquid into a vapor state, resulting in the formation of literally thousands of minute bubbles. The subsequent decrease of velocity and pressure rise that occurs after the valve seating area, when the pressure rise condition resumes, causes these vapor bubbles to collapse at the rate of many times per second. Should this occur in close proximity to any metal surface, damage can take place. Over time, this can lead to valve failure due to the vibration and/or erosion. Minimizing or eliminating these conditions that adversely effect operation and service life of the valve continues to be one of the most serious challenges encountered in the daily operation of a water distribution system, such as municipal water systems and the like.

To overcome the adverse effects of the orifice action of the valve, it has become common practice to design the valve so as to break up the flow through the valve into a multitude of small streams which are then led through convoluted paths to produce energy losses in the fluid. Such designs are known as torturous fluid flow redirection. An example of such designs are disclosed in U.S. Pat. No. 4,567,915 to Bates et al.; U.S. Pat. No. 4,024,891 to Engle et al.; and U.S. Pat. No. 4,693,450 to Paetzel.

While effectively reducing noise and cavitation, these devices are not optimal. The primary disadvantage of such designs is that the valve capacity is significantly lowered, rendering these valves inapplicable in certain situations. Such valve designs also require fairly complex and expensive manufacturing and assembly.

Other valve assemblies are known, such as those produced by Ross Valve Manufacturing Company Inc., which utilize aligned plates that serve to suppress vibration, pressure fluctuations, cavitation and noise. For example, an upstream corrugated plate may be selectively slid into place to control the flow. A downstream plate having a plurality of apertures creates a plurality of jets which reduces the pressure flow through the set of plates. However, the number and size of aperture in the plates, the number of plates, and their spacing are determined by fluid flow, and varying flows can make such orifice plates ineffective.

Singer Valve Inc. offers an anti-cavitation trim having interconnecting canisters with a plurality of small round apertures which overcomes many of the previous problems of the "torturous path" and "stacked plates" designs. The Singer valve is able to effectively and substantially eliminate noise and cavitation. However, this valve assembly is prone to fouling or clogging due to the use of the small round apertures in the canisters. In fact, the fluid must often be filtered before passing through the Singer valve assembly. Moreover, when the fluid exits the canisters of the Singer valve assembly, it is directed directly at the housing wall, causing erosion.

Accordingly, there is a continuing need for a valve assembly having anti-cavitation and low-noise properties while handling a large fluid flow capacity. Such a valve assembly should be adjustable so as to control the flow of fluid therethrough while optimizing the pressure drop and reducing the negative impacts on the inner surfaces of the valve housing. The present invention fulfills these needs and provides other related advantages.

SUMMARY OF THE INVENTION

The present invention resides in a valve assembly which reduces pressure through the valve while substantially eliminating cavitation and its attendant disadvantages. The valve assembly of the present invention also directs the fluids through the valve such that damage is minimized by other forces, such as fluid flow.

In general, the valve assembly of the present invention comprises a seat disposed within a housing intermediate a fluid inlet and fluid outlet thereof. The seat includes a wall defining an inner-chamber, and a plurality of elongated slots formed in the seat wall. In a particularly preferred embodiment, the seat includes a bottom wall having a circumferential wall extending upwardly therefrom and defining an inner chamber. The elongated slots are formed in the circumferential seat wall. Preferably, the elongated slots are formed at a direct angle of approximately ninety degrees with respect to the seat wall so as to direct the fluid towards the center of the seat chamber.

A disc guide is associated with the seat such that the seat and disc guide are slidably moveable relative to one another. In a particularly preferred embodiment, the seat is fixed to the housing, and the disc guide is moved relative to the seat, such as by hydraulic control means or the like.

The disc guide includes a wall having a plurality of elongated slots formed therein. In a particularly preferred embodiment, the disc guide includes a top wall and a circumferential wall extending downwardly therefrom. The elongated slots are formed in an upper portion of the circumferential wall. The elongated slots are preferably formed in the disc guide wall such so as to direct the fluid towards the housing at a non-direct angle. Accordingly, the elongated slots are formed in a disc guide at an offset angle, other than ninety degrees.

The disc guide top wall is adapted to sealingly engage an upper edge of the seat. A non-slotted lower portion of the circumferential disc guide wall is configured to substantially occlude the elongated slots of the seat when the disc guide and the seat are moved a into a closed position.

When the disc guide and seat are moved into a closed position, fluid is prevented from passing from the housing fluid inlet to the housing fluid outlet. When the disc guide and seat are moved into an open position, fluid is directed from the housing fluid inlet through the seat elongated slots, into the seat inner-chamber, into the disc guide inner-chamber, and through the disc elongated slots to the housing fluid outlet, resulting in reduced fluid pressure while minimizing cavitation.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

As shown in the accompanying drawings for purposes of illustration, the present invention resides in a valve assembly, generally referred to by the reference number 10. The assembly 10 of the present invention, as will be more fully described herein, is designed and configured to reduce fluid pressure through the valve assembly 10, while substantially eliminating cavitation. The valve assembly 10 of the present invention also directs the fluid in such a manner that erosion damage is minimized.

Figure 1:
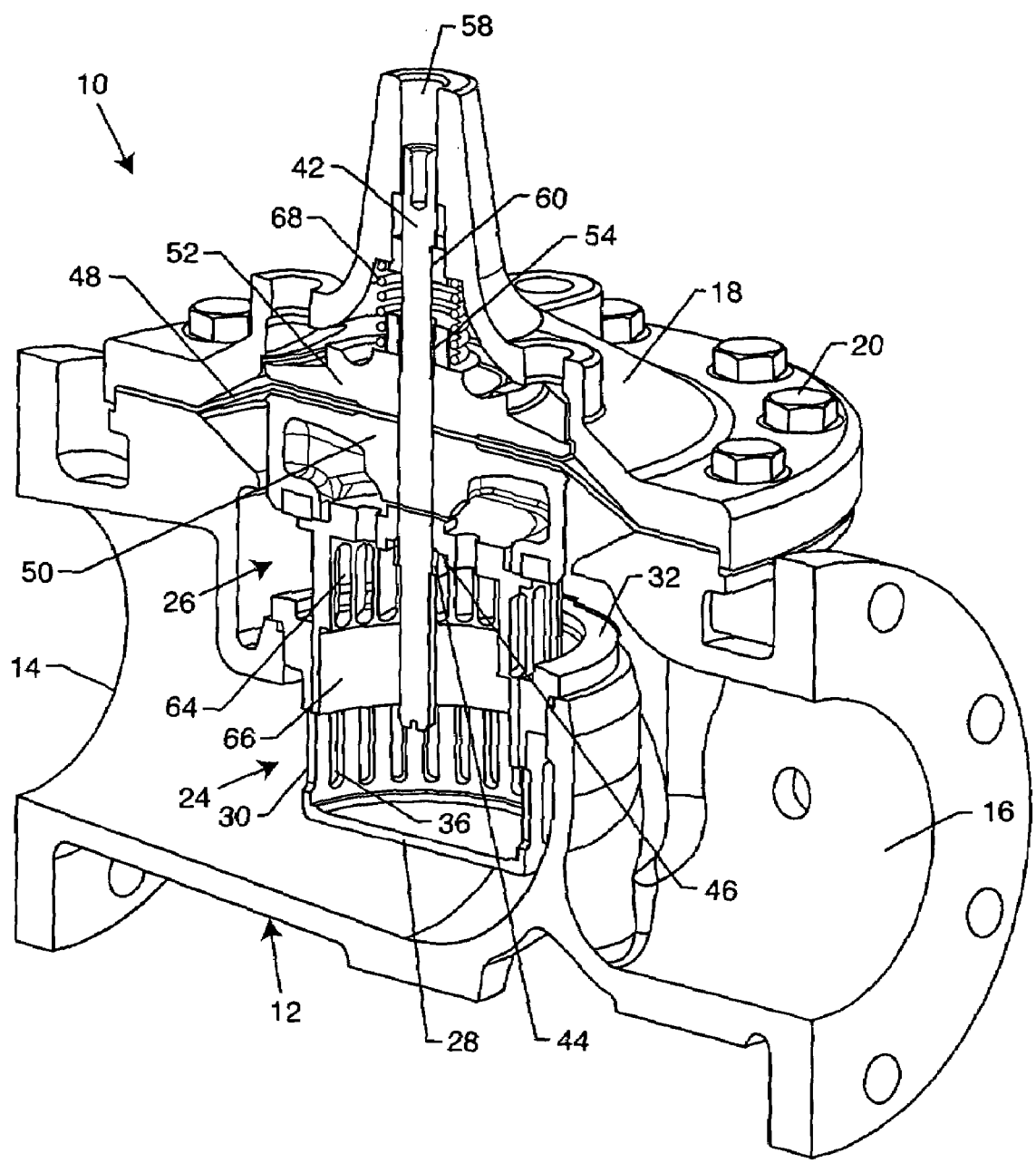
FIG. 1 is a sectioned perspective view of a valve assembly embodying the present invention, with a seat and disc guide in an open position.

With reference now to FIG. 1, the valve assembly 10 includes a body or housing 12 defining a fluid inlet 14 and a fluid outlet 16. As illustrated, this fluid inlet 14 and outlet 16 are at generally opposite sides of the housing 12. A cover 18 is disposed on the housing 12 and attached or fixed into place using bolts 20 or the like. The housing 12 and cover 18 define the major pressure boundaries of the assembly 10, and collectively form an inner-fluid chamber between the inlet 14 and outlet 16. As the valve assembly 10 of the present invention is typically utilized in high-pressure environments, such as municipal water supply lines and the like, the body 12 and cover 18 are comprised of durable materials, such as cast metals or the like.

The valve assembly 10 of the present invention is particularly designed for circumstances wherein a large pressure drop is required. As discussed above, large pressure drops in fluid flows can create cavitation and noise, which can be destructive to the components of the valve.

Figure 2:
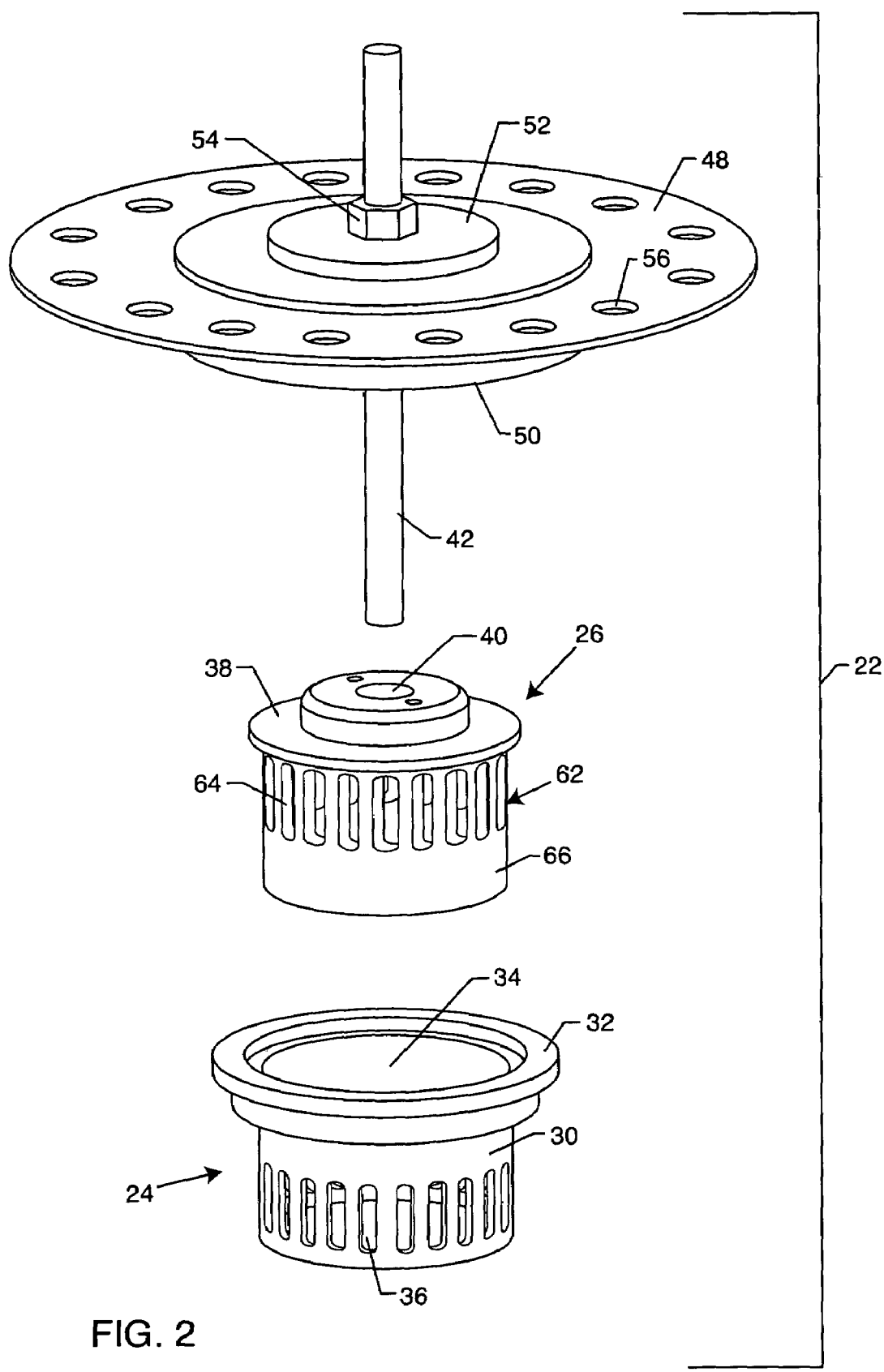
FIG. 2 is a partially exploded perspective view of component parts of the assembly of the present invention.

With reference now to FIGS. 1 and 2, the valve assembly 10 includes a sub-assembly 22, sometimes also referred to as "trim", which is designed to create the necessary pressure drop across the valve assembly 10 while imparting anti-cavitation and anti-erosion properties. In particular, the sub-assembly 22 includes a seat 24 which is slidably engageable with a disc guide 26. As will be more fully described herein, when the seat 24 and disc guide 26 are moved towards one another in a closed position, fluid flow is shut off to the outlet 16 of the valve assembly 10. However, as the seat 24 and disc guide 26 are increasingly moved away from one another into an open position, fluid is allowed to flow therethrough from the inlet 14 and through the outlet 16 of the assembly 10.

Figure 3:
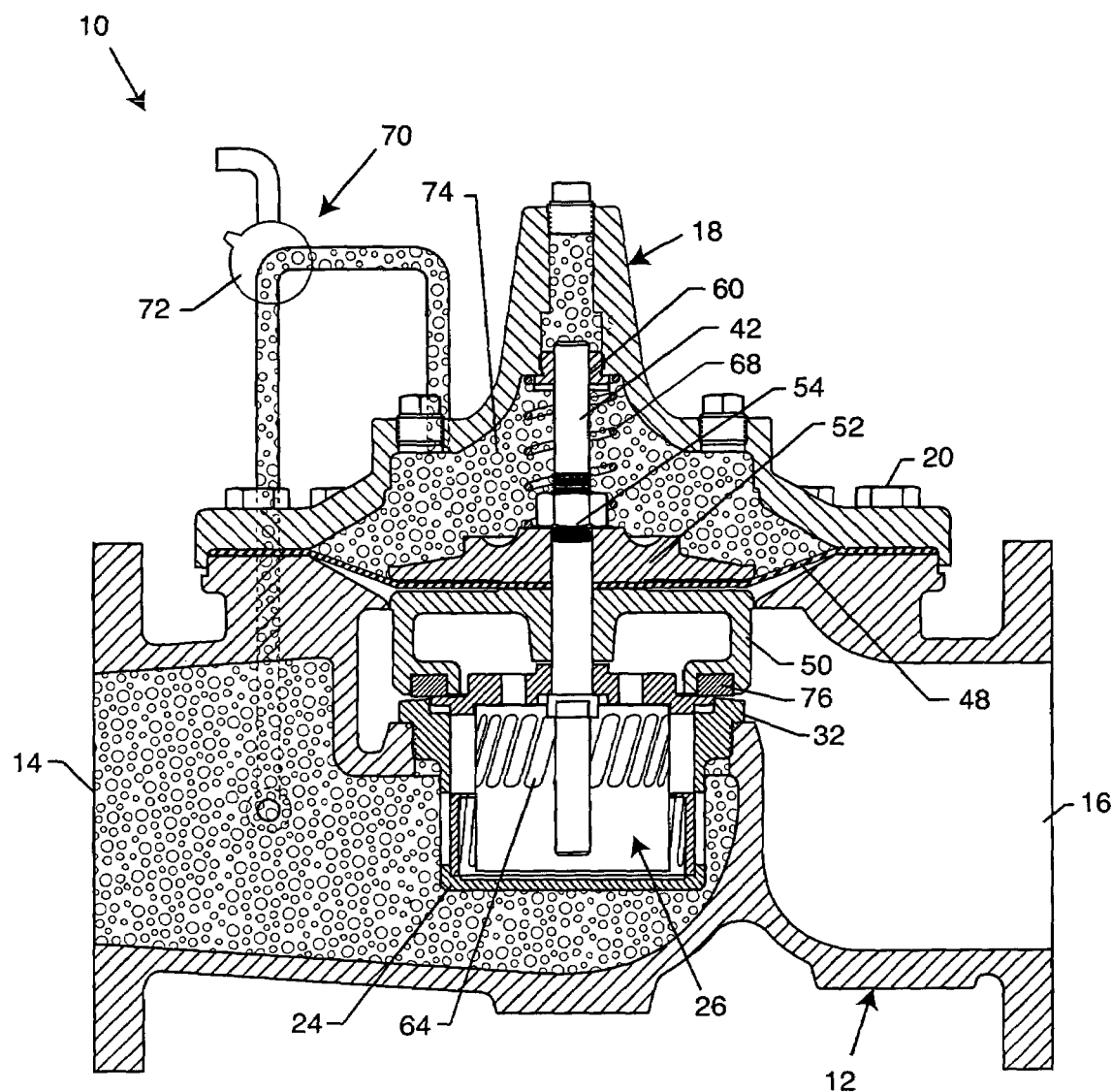
FIG. 3 is a cross-sectional and diagrammatic view of the valve assembly of the present invention in a closed state.
Figure 4:
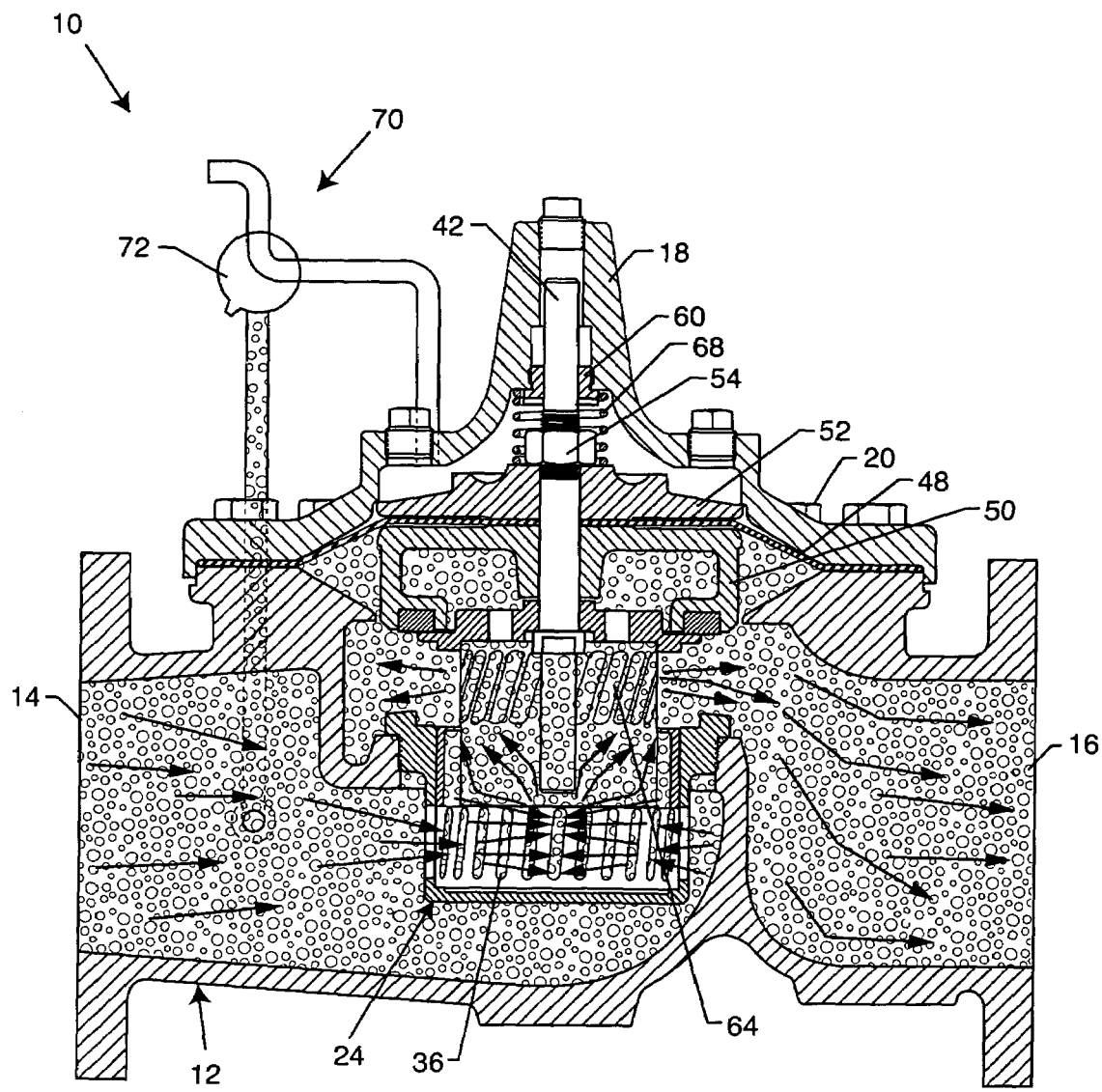
FIG. 4 is a cross-sectional and diagrammatic view of the valve assembly in an open state.

In a particularly preferred embodiment, as illustrated in FIGS. 1, 3 and 4, the seat 24 is securely attached to the housing 12, such as by threaded attachment, bolts, or any other appropriate securing means. The seat 24 includes a bottom wall 28 and a circumferential wall 30 extending upwardly therefrom to an upper rim or lip 32. The bottom wall 28 and circumferential wall 30 cooperatively define a seat inner-chamber 34. As illustrated, the seat 24 is typically of a cannister or cylindrical configuration, although it is not limited to such.

A plurality of elongated slots 36 are formed in the seat circumferential wall 30. Typically these elongated slots 36 are formed in a lower portion of the seat wall 30. Typically, the elongated vertical slots 36 are spaced apart about the circumferential wall 30. The total open area of the slots 36 is less than the total open area of the valve inlet 14, causing a pressure drop to occur across the slot detail. In a particularly preferred embodiment, the elongated vertical slots 36 are formed at a direct, or approximately ninety degree, angle with respect to the circumferential wall 30 so as to direct fluid flow from the slots 36 and towards a central portion of the seat chamber 34, such that the fluid flow converges upon itself within the central chamber 34 when the valve assembly 10 is open, as illustrated in FIG. 4.

The fluid flow is then redirected from this central chamber 34 to the disc guide 26. The disc guide 26, as shown in FIG. 2, includes a top wall 38 having an aperture therethrough 40 for reception of a stem or shaft 42. A shoulder 44 is formed on the stem 42 and rests within a ledge 46 of the disc guide top wall 38 to inter-connect the shaft 42 and the disc guide 26.

With particular reference to FIG. 2, a diaphragm 48, typically comprised of an elastomeric material such as rubber or the like, is sandwiched between a disc retainer 50 and a diaphragm washer 52. The stem extends though the diaphragm 48, disc retainer 50 and diaphragm washer 52. These components 42 and 48–52 are held together by a nut 54 threadedly received on the stem 42, or other such holding means. The stem nut 54 is tightened to press the diaphragm washer 52, diaphragm 48 and disc retainer 50 tightly against one another. Thus, in the final assembly 10, the disc guide 26, stem 42, diaphragm 48, disc retainer 50 and diaphragm washer 52 are all inter-connected with one another.

With continuing reference to FIGS. 1 and 2, it will be noted that the flexible diaphragm includes a plurality of apertures 56. These apertures 56 are sized and numbered so as to correspond with the bolts 20 extending through the cover 18 and into the housing body 12. As shown in FIG. 1, the cover 18 includes an aperture or guideway 58 through which the stem 42 can at least partially travel in a vertical direction. A cover bearing 60 aligns the stem 42 to ensure its proper vertical travel.

Thus, as the stem 42 travels up and down along a vertical path, the disc guide 26 is moved up and down, and out of the seat 24 and into the seat 24. In particular, the disc guide 26 includes a circumferential wall 62 extending downwardly from the top wall 38 and sized and configured so as to be received within the inner-chamber 34 of the seat 24, preferably immediately adjacent to the circumferential wall 30 of the seat 24. A plurality of elongated vertical slots 64 are formed in a circumferential wall 62 of the disc guide 26. The slots 64 are formed in an upper portion of the wall 62. A lower portion 66 of the circumferential wall 62 is not slotted and is sized so as to substantially completely occlude the slots 36 of the seat 24 when the disc guide 26 is completely lowered therein. This is referred to herein as the "closed" position. As the stem 42 travels upward, the disc guide 26 is also moved upward and out of the seat 24, at least partially exposing the seat slots 36, allowing fluid to flow therethrough.

With reference now to FIGS. 3 and 4, when fluid is not flowing through the valve assembly 10, the weight of the disc guide 26, stem 42, etc., cause the stem 42 and disc guide 26 to be positioned downwardly into the seat 24 so as to be in a closed position. A spring 68 is disposed between the cover 18 and the diaphragm washer 52, so as to bias the disc guide 26 into the seat 24 in the closed position.

When fluid is present in the valve assembly 10, the fluid pressure is typically sufficient to act upon the flexible diaphragm 48 and move the diaphragm 48 as well as the disc guide 26, stem 42, disc retainer 50 and diaphragm washer 52 upwardly so as to open the valve assembly 10 and permit fluid flow therethrough, as illustrated in FIG. 4. In order to selectively open or close the valve assembly 10, and thus the position of the disc guide 26 relative to the seat 24, hydraulic control means 70 are incorporated into the assembly 10. Such hydraulic controls 70 are well known in the art.

Briefly, a switching valve 72 or the like is selectively opened and closed to introduce fluid into an upper pressure chamber 74 between the cover 18 and the diaphragm washer 52, as illustrated in FIG. 3. The increased fluid pressure between the cover 18 and diaphragm washer 52 causes the diaphragm washer 52, and thus the stem 42, diaphragm 48, disc retainer 50 and disc guide 26 downwardly. If sufficient fluid is introduced into the pressure chamber 74, the disc guide 26 is wholly lowered into the seat 24, such that the lower portion 66 of the disc guide wall 62 occludes the seat slots 36. This effectively closes the seat slots 36 and does not permit fluid flow therethrough. As an added measure, the peripheral edge of the disc guide upper wall 38 and the upper lip 32 of the seat 24 come into contact with one another. Either the upper wall 38 or a lower portion of the disc retainer 50 may include a seal 76, such as a rubber disc or O-ring or the like, to create a fluid seal between the seat 24 and the disc guide 26 or disc retainer 50. Thus, no fluid is allowed from the fluid inlet 14 to the fluid outlet 16, as illustrated in FIG. 3.

With particular reference now to FIG. 4, when the hydraulic control valve 72 is closed such that fluid is not introduced into the pressure chamber 74, the fluid pressure from the inlet 14 acts upon the components of the sub-assembly 22 so as to lift the disc guide 26, stem 42, diaphragm 48, disc retainer 50 and diaphragm washer 52 upwardly. If little or no fluid is introduced into the pressure chamber 74, the disc guide 26 will be moved to its uppermost point so as to be in a completely open position. It will be appreciated by those skilled in the art that the hydraulic controls means 70 can be altered so as to control the position of the disc guide 26 relative to the seat 24 between a fully closed position, as illustrated in FIG. 3, and fully opened position as illustrated in FIG. 4.

Figure 5:
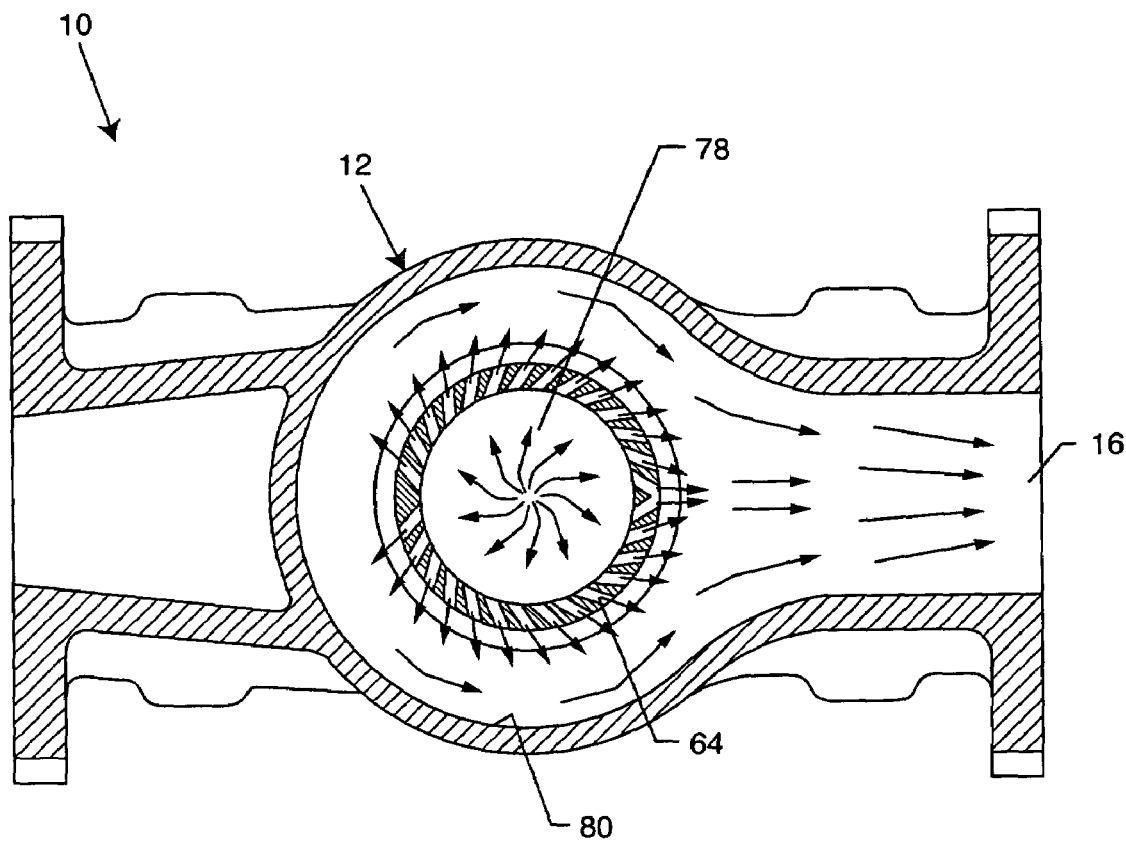
FIG. 5 is a cross-sectional view of the valve assembly, illustrating the flow of fluid at an angle from the disc guide to an outlet of the valve assembly when in the open position.

With reference now to FIGS. 4 and 5, as described above, the total opening of the combined slots 36 of the seat 24 is less than the total open area of the valve inlet 14, causing a pressure drop to occur. The elongated vertical slots 36 are preferably formed at a direct angle into the seat wall 30 so as to direct the flow of fluid centrally into the seat innerchamber 34 such that the fluid converges upon itself, as illustrated by the arrows in FIG. 4. Aside from creating a pressure drop, potential cavitation is dissipated in the central chamber 34 of the seat 24 by the convergence and impinging of the fluid. The fluid is then directed upwardly into an inner chamber 78 of the disc guide 26. Such inner-chamber 78 is defined by the upper wall 38 and lower circumferential wall 62 of the disc guide 26, as shown in the accompanying illustrations. The fluid then is directed out through the elongated vertical slots 64 of the disc guide 26, and eventually through the assembly outlet 16, as illustrated in FIGS. 4 and 5. The re-direction of the fluid flow from the seat 24, into the disc guide 26 and through the outlet 16 creates yet another pressure drop.

Typically, the slots 64 of the disc guide 26 and the slots 36 of the seat 24 have approximate equivalent flow areas or openings. Thus, as the slots 36 and seat 24 are exposed, allowing an increase of fluid flow while maintaining a controlled pressure drop, an equivalent slot detail 64 in the disc guide 26 is exposed, allowing a controlled pressure drop to the valve assembly 10.

With particular reference now to FIG. 5, if the fluid is allowed to flow directly from the disc guide 26 to the inner wall 80 of the housing 12, erosion will occur over time. The present invention minimizes this erosion by forming the elongated vertical slots 64 in the disc guide wall 62 at a non-direct or offset angle, other than 90 degrees. As the slots 64 are oriented in an angular direction, as illustrated in FIG. 5, the fluid exiting the disc guide slots 64 is diverted away from direct impact into the pressure boundary inner surface 80 of the housing 12. This angular path increases the distance between the slots 64 and the pressure boundary surface inner-wall 80, reducing erosion to the inner surface 80 of the housing 16.

Whereas a single large pressure drop can cause cavitation and noise problems, the present invention uses a combination of series of small pressure drops through the valve assembly 10. As described above, the first pressure drop occurs as the fluid passes through the slots 36 of the seats 24. Additional pressure drops occur as the fluid is directed from the seat 24 and into the disc guide 26. An additional pressure drop is created as the fluid flows out of the disc guide slots 64 at an angle towards the inner-surface pressure boundaries 80 of the housing 12. These series of smaller pressure drops help to prevent the fluid from reaching a vapor pressure or cavitation condition, allowing a large total pressure drop to occur through the main valve assembly 10 without creating a damaging cavitation condition.

The valve assembly 10 of the present invention also optimizes fluid flow through the valve assembly 10 by utilizing elongated vertical slots 36 and 64, which provide a greater fluid flow and are not as prone to clogging or fouling as with prior art assemblies. Moreover, the fluid is not forced through a torturous pathway or maze of apertures, slots, paths, etc., as with prior designs. Thus, the valve assembly 10 of the present invention is able to accommodate a rather large volume of fluid therethrough while having low-noise and anti-cavitation properties.

Another advantage of the present invention, as described above, is the use of the angularly offset slots 64 and the disc guide 26, creating a pressure drop while reducing harmful erosion to the inner pressure surface boundaries 80 of the housing 12. Moreover, the valve assembly 10 of the present invention is relatively simple in design and easy to manufacture and assemble in diaphragm actuated control valve assemblies.

Although an embodiment has been described in detail for purposes of illustration, various modifications may be made without departing from the scope and spirit of the invention. Accordingly, the invention is not to be limited, except as by the appended claims.

What is claimed is:

1. A valve assembly for reducing cavitation, comprising:
a housing having a fluid inlet and a fluid outlet;

a seat disposed within the housing intermediate the fluid inlet and outlet, the seat including a wall defining an inner chamber and a plurality of elongated slots formed in the seat wall; and a disk guide associated with the seat such that the seat and disk guide are slidably movable relative to one another, the disk guide including a wall defining an inner chamber and a plurality of elongated slots formed in the disk guide wall, wherein the elongated slots are formed in the disk guide wall such so as to direct the fluid towards the housing at a non-direct angle;

wherein the disk guide and seat are moved into a closed position, fluid is prevented from passing from the housing fluid inlet to the housing fluid outlet; and wherein the disk guide and seat are moved into an open position, fluid is directed from the housing fluid inlet through the seat elongated slots, into the seat inner chamber, into the disk guide inner chamber, and through the disk guide elongated slots to the housing fluid outlet resulting in reduced fluid pressure while minimizing cavitation.

2. The assembly of claim 1, wherein the seat is fixed to the housing and the disk guide is moved relative to the seat.

3. The assembly of claim 2, including a hydraulic control means for selectively moving the disk guide.

4. The assembly of claim 1, wherein the seat includes a bottom wall and a circumferential wall, the elongated slots being formed in the circumferential wall.

5. The assembly of claim 1, wherein the elongated slots are formed in the seat wall such so as to direct the fluid towards a center of the seat inner chamber.

6. The assembly of claim 5, wherein the slots are formed in the seat wall at a direct angle of approximately ninety degrees with respect to the seat wall.

7. The assembly of claim 1, wherein the disk guide wall includes a non-slotted lower portion configured to substantially occlude the elongated slots of the seat when the disk guide and seat are in their closed position.

8. The assembly of claim 1, wherein the disk guide is adapted to substantially sealingly engage an upper edge of the seat.

9. The assembly of claim 1, wherein the elongated slots are formed in the disk guide at an offset angle other than ninety degrees.

10. A valve assembly for reducing cavitation, comprising:
a housing having a fluid inlet and a fluid outlet;
a seat fixed to the housing intermediate the fluid inlet and outlet, the seat including a bottom wall, a circumferential wall extending upwardly from the bottom wall and defining an inner chamber, and a plurality of elongated slots formed in the seat circumferential wall at a direct angle of approximately ninety degrees with respect to the seat wall so as to direct fluid towards a central portion of the seat inner chamber; and
a disk guide slidably associated with the seat, the disk guide including a top wall and a circumferential wall defining an inner chamber, and a plurality of elongated slots formed in an upper portion of the disk guide circumferential wall such so as to direct the fluid towards the housing at a non-direct angle, and a non-slotted lower portion configured to substantially occlude the elongated slots of the seat when the disk guide and seat are in moved into a closed position;
wherein the disk guide is moved into a closed position, fluid is prevented from passing from the housing fluid inlet to the housing fluid outlet; and wherein the disk guide is moved into an open position, fluid is directed from the housing fluid inlet through the seat elongated slots, into the seat inner chamber, into the disk guide inner chamber, and through the disk guide elongated slots to the housing fluid outlet resulting in reduced fluid pressure while minimizing cavitation.

11. The assembly of claim 10, including a hydraulic control means for selectively moving the disk guide.

12. The assembly of claim 10, wherein the disk guide is adapted to substantially sealingly engage an upper edge of the seat.

13. The assembly of claim 10, wherein the elongated slots are formed in the disk guide at an offset angle other than ninety degrees.

14. A valve assembly for reducing cavitation, comprising:
a housing having a fluid inlet and a fluid outlet;
a seat disposed within the housing intermediate the fluid inlet and outlet, the seat including a wall defining an inner chamber and a plurality of elongated slots formed at a direct angle in the seat wall, wherein each elongated slot has a correlating slot formed in the seat wall generally directly opposite it, the slots guiding the fluid to a central portion of the inner chamber such that the fluid converges upon itself; and
a disk guide associated with the seat such that the seat and disk guide are slidably movable relative to one another, the disk guide including a wall defining an inner chamber and a plurality of elongated slots formed in the disk guide wall;
wherein the disk guide and seat are moved into a closed position, fluid is prevented from passing from the housing fluid inlet to the housing fluid outlet; and
wherein the disk guide and seat are moved into an open position, fluid is directed from the housing fluid inlet through the seat elongated slots, into the seat inner chamber, into the disk guide inner chamber, and through the disk guide elongated slots to the housing fluid outlet resulting in reduced fluid pressure while minimizing cavitation;
wherein the seat includes a bottom wall and a circumferential wall, the elongated slots being formed in the circumferential wall being vertically oriented and of approximately the same dimension.

15. The assembly of claim 14, wherein the seat is fixed to the housing and the disk guide is moved relative to the seat.

16. The assembly of claim 15, including a hydraulic control means for selectively moving the disk guide.

17. The assembly of claim 14, wherein the slots are formed in the seat wall at a direct angle of approximately ninety degrees with respect to the seat wall.

18. The assembly of claim 14, wherein the disk guide wall includes a non-slotted lower portion configured to substantially occlude the elongated slots of the seat when the disk guide and seat are in their closed position.

19. The assembly of claim 14, wherein the disk guide is adapted to substantially sealingly engage an upper edge of the seat.

20. A valve assembly for reducing cavitation, comprising:
a housing having a fluid inlet and a fluid outlet;
a seat disposed within the housing intermediate the fluid inlet and outlet, the seat including a wall defining an inner chamber and a plurality of elongated slots formed at a direct angle in the seat wall, wherein each elongated slot has a correlating slot formed in the seat wall generally directly opposite it, the slots guiding the fluid to a central portion of the inner chamber such that the fluid converges upon itself; and a disk guide associated with the seat such that the seat and disk guide are slidably movable relative to one another, the disk guide including a wall defining an inner chamber and a plurality of elongated slots formed in the disk guide wall;

wherein the disk guide and seat are moved into a closed position, fluid is prevented from passing from the housing fluid inlet to the housing fluid outlet; and wherein the disk guide and seat are moved into an open position, fluid is directed from the housing fluid inlet through the seat elongated slots, into the seat inner chamber, into the disk guide inner chamber, and through the disk guide elongated slots to the housing fluid outlet resulting in reduced fluid pressure while minimizing cavitation;

wherein the elongated slots are formed in the disk guide wall at an angular incidence so as to direct the fluid towards the housing at a non-direct angle, increasing the fluid path distance between the disc guide slots and the housing wall.

21. The assembly of claim 20, wherein the seat is fixed to the housing and the disk guide is moved relative to the seat.

22. The assembly of claim 21, including a hydraulic control means for selectively moving the disk guide.

23. The assembly of claim 20, wherein the slots are formed in the seat wall at a direct angle of approximately ninety degrees with respect to the seat wall.

24. The assembly of claim 20, wherein the disk guide wall includes a non-slotted lower portion configured to substantially occlude the elongated slots of the seat when the disk guide and seat are in their closed position.

25. The assembly of claim 20, wherein the disk guide is adapted to substantially sealingly engage an upper edge of the seat.

* * * * *